Figure 1:
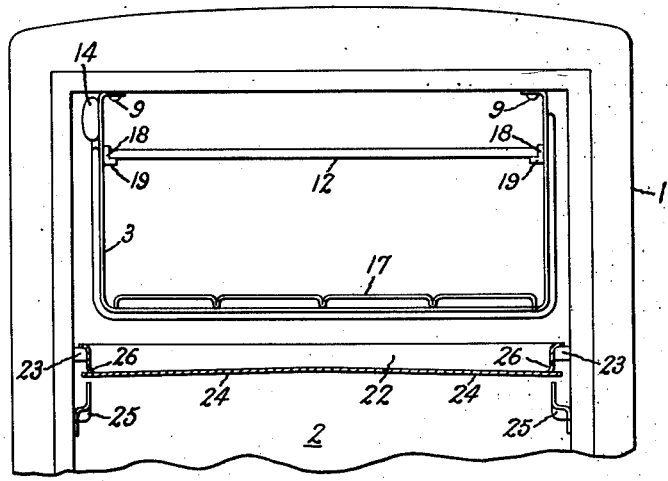

May 5, 1953  L. W. ATCHISON  2,637,180

ELECTRICAL DEFROSTING ARRANGEMENT FOR REFRIGERATORS

Filed Nov. 21, 1950

Inventor:
Leonard W. Atchison,
by *William B. Edwards, Jr.*
His Attorney.

Patented May 5, 1953

2,637,180

UNITED STATES PATENT OFFICE 2,637,180

ELECTRICAL DEFROSTING ARRANGEMENT FOR REFRIGERATORS

Leonard W. Atchison, Erie, Pa., assignor to General Electric Company, a corporation of New York Application November 21, 1950, Serial No. 196,897

4 Claims. (Cl. 62—126)

My invention relates to defrosting arrangements for refrigerators and more particularly to electrical defrosting arrangements therefor.

In many household refrigerators an evaporator, which usually operates at a temperature below the freezing point of water, is disposed within the food storage compartment of the refrigerator for cooling this compartment. In order to maintain a satisfactory efficiency of the refrigerating apparatus, it is necessary from time to time to remove the frost from the evaporator. The removal of frost introduces the problem that, if the defrosting continues over a relatively long period, the temperatures of the frozen food, ice cream, etc., stored within the evaporator may rise to a temperature which destroys their value. Electric heating elements have been employed for increasing the speed of defrosting, but the temperature reached by such heating elements is such that the food stored within the evaporator may also reach undesirably high temperatures. By my arrangement, an electric heating element is provided for defrosting, and at the same time a construction is provided whereby the food within the evaporator is spaced from the surface heated by the heating element so that heat conduction from the heating element to the food is minimized. In this manner, by employing a relatively high wattage heating element, I am able to accomplish defrosting of the evaporator rapidly and at the same time to so retard heat transfer to the food stored therein that none of the food reaches an undesirably high temperature.

It is an object of my invention to provide an improved defrosting arrangement for refrigerator evaporators by which the rise in temperature of the food stored in the evaporator during defrosting is minimized.

It is another object of my invention to provide an improved arrangement for rapidly defrosting a refrigerator evaporator by electric heating and including provision for retarding conduction of heat from the heating element to food stored within the evaporator.

Further objects and advantages of my invention will become apparent as the following description proceeds and the features of novelty which characterize my invention will be pointed out with particularity in the claims annexed to and forming part of this specification.

In carrying out the objects of my invention, an electric heating element is secured to the walls of the evaporator on the exterior surface, that is, the surface exposed to the air in the food storage compartment, upon which frost collects. Two shelves are provided within the evaporator for supporting food stored within the evaporator. The lower shelf is arranged in one of several ways for maintaining the major food supporting surface thereof spaced from the bottom wall of the evaporator, so that transfer of heat from the heating element secured to the walls of the evaporator to the food stored on the bottom shelf is minimized. This minimizing of the heat transfer may be accomplished, for example, by shaping the bottom shelf so that a plurality of elements of relatively small total area support the major area of the shelf in spaced relationship with the bottom wall of the evaporator or alternatively, the shelf may be supported by spacers of the material of low heat conductivity which in turn are mounted on the side walls of the evaporator to maintain the food supporting surface of the shelf in spaced relationship with the bottom wall of the evaporator. The second or upper shelf may be refrigerated for providing an area for rapid ice freezing and this shelf is supported by heat-insulating spacers mounted on the side walls to minimize heat transfer from the side walls to the food stored on the upper shelf.

Figure 2:
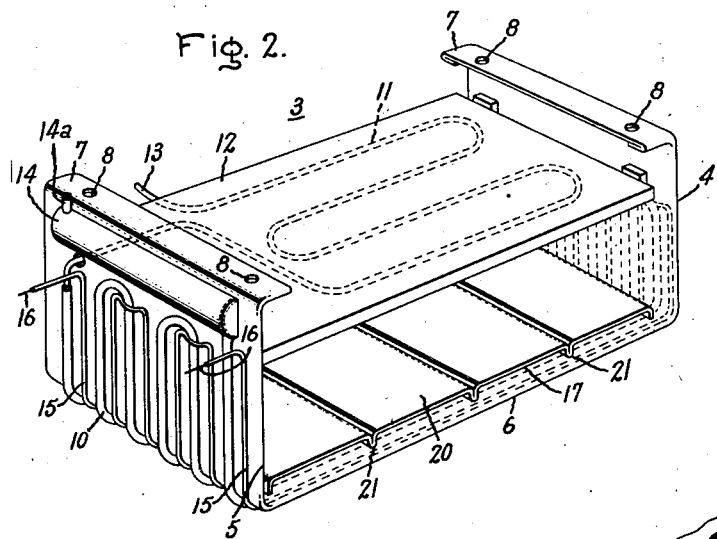
Figure 3:
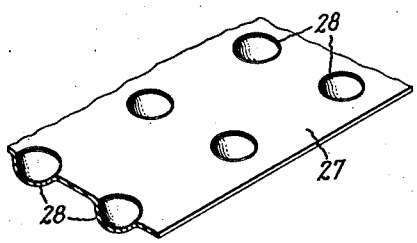
Figure 4:
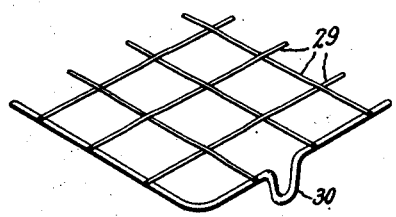

For a better understanding of my invention, reference may be had to the accompanying drawing in which Fig. 1 is an elevation view of a portion of a refrigerator illustrating an embodiment of my invention; Fig. 2 is an isometric view of the evaporator of Fig. 1; Fig. 3 is a view of a modified form of lower shelf construction; and Fig. 4 is a view of another modified form of lower shelf construction.

Referring now to Figs. 1 and 2 of the drawing, there is shown a refrigerator 1, which includes a food storage compartment 2. An evaporator 3 is disposed in the upper portion of the food storage compartment for cooling this compartment. In the form illustrated, the evaporator is formed from a metal sheet bent into generally U shape, and including two side walls 4 and 5 and a bottom wall 6. At its ends the sheet is formed to provide two flanges 7, having openings 8 therein, through which screws 9, or other suitable fastening devices, extend to mount the evaporator on the top wall of the storage compartment 2. In the form illustrated, the evaporator is refrigerated by refrigerant-conducting tubing 10, which is secured to the exterior of the side and bottom walls 4, 5, 6 of the evaporator. The tubing 10 further includes a section 11, which is secured to the underside of a shelf 12 in the upper portion of the evaporator for providing a refrigerated shelf in the evaporator. Liquid refrigerant is supplied from a condensing unit (not shown) through a capillary, or restricting, tube 13 to the section 11 of the refrigerant-conducting tubing secured to the refrigerated shelf 12. The tubing then extends along the exterior of the walls of the evaporator and eventually to a header 14 from which vaporized refrigerant is returned to the condensing unit through a suction line 14a.

The evaporator 3 normally operates at a temperature below the freezing point of water and hence, moisture from the air in the food storage compartment condenses on the evaporator and collects in the form of frost. To maintain a relatively high operating efficiency of the refrigerating apparatus, it is necessary to remove this frost from time to time. In order to effect such removal, an electric heating element 15 is secured in heat exchange relationship with the walls 4, 5 and 6 of the evaporator. The heating element, like the tubing 10, is arranged in serpentine form, and the turns of the heating element run generally parallel to those of the tubing 10. Power is supplied for energizing the heating element 15 from any suitable source through lines 16. The heating element may be energized in any one of a number of ways well known in the art, for example by a timer, which energizes the heating element for defrosting the evaporator at a particular time of the day, or by an automatic device which energizes the heating element after a predetermined number of cycles of the refrigerating unit or a predetermined number of openings of the door of the refrigerator, etc. The particular arrangement for energizing the heating element forms no part of my invention and is not illustrated herein. The heating element 15 employed is preferably of relatively high wattage so that a large amount of heat is supplied to the evaporator and the evaporator is defrosted within a relatively short period. For example, I have employed a heating element of 1000 watts and, with such a heating element, I have removed frost approximately three-eighths inch thick from the evaporator within 3 to 4 minutes. A 300-watt heating element has also been employed, approximately 10 minutes then being required for removing an equivalent amount of frost. In each case, by using my arrangement described below the frozen food was not damaged.

Food is stored within the evaporator 3 upon the upper shelf 12 and upon a lower shelf 17. This food may comprise various articles such as frozen foods, ice cream, etc., and to prevent damage thereto it is desirable to minimize the rise in temperature of the food during the defrosting operation. To minimize heat transfer to the food stored on the top shelf 12, this shelf is supported from the side walls by insulating spacers or supports 18. The spacers 18 are of generally L-shape, as illustrated, and are made of a material of relatively low heat conductivity, such as any of a number of conventional plastic materials. The spacers 18 are secured to the side walls 4 and 5 in any suitable manner, as by screws (not shown), and include legs 19 upon which the shelf 12 is supported. By this arrangement the shelf 12 is supported in spaced relationship with respect to the side walls 4 and 5, the spacers 18 providing a path of relatively poor heat conductivity. Hence, during the short time when the heating element 15 is energized relatively little heat is transferred through the spacers 18 to the shelf 12, and rise in temperature of any food stored on the shelf 12 is minimized.

To minimize the transfer of heat from the heating element 15 to food stored on the shelf 17, this shelf is formed and mounted so as to maintain the food supporting surface in spaced relationship with the bottom wall 6 of the evaporator. One form of shelf for accomplishing this result is illustrated in Fig. 2. The shelf 17 is formed from a metal sheet which includes a flat food supporting surface 20, spaced from the bottom wall 6 of the evaporator. To effect this spacing, the shelf is formed in generally corrugated shape to provide a plurality of depending elongated feet 21 resting on the bottom wall 6 of the evaporator and supporting the shelf thereon. The feet 21 have substantially line contact with the bottom wall 6 of the evaporator, and hence, a very small total area of contact with the bottom wall 6 is provided. This provides a relatively poor heat transfer path between the bottom wall 6 and the food supporting surface 20 of the shelf 17 and hence minimizes heat transfer from the heating element 15 to the food stored on the food supporting surface 20 during the defrosting operation.

By the arrangement disclosed, frost is completely removed from the evaporator very quickly because of the high wattage electric heating element which transfers heat directly to the walls 4, 5 and 6 of the evaporator. At the same time, because of the arrangement described for spacing the upper shelf 12 and the bottom shelf 17 from the walls of the evaporator, relatively little heat is transferred to the food stored on these shelves during the short defrosting period, and hence, any rise in temperature of this food is minimized.

Defrost water dripping from the evaporator 3 falls into a drip tray 22, mounted on supports 23 below the evaporator 3. The bottom of the drip tray 22 is sloped from the center toward the side walls as indicated at 24, so that water condensing on the bottom thereof is directed toward the sides of the compartment 2. Inclined troughs 25 are secured to the side walls of the compartment 2 for directing this water toward the rear of the compartment where it may flow down the rear wall of the compartment 2 and through a suitable drain opening in the bottom of the compartment. If desired, openings 26 may be provided in the sides of the drip tray 22 so that water collecting in the drip tray is discharged through these openings into the inclined troughs 25 for disposition in the manner described above.

In Fig. 3 there is shown a modified form of my invention in which the lower shelf corresponding to the shelf 17, in lieu of being formed in the generally corrugated form shown in Fig. 2, is shaped to provide a food supporting surface 27 and a plurality of spaced dimples 28 are pressed into the sheet from which the shelf is formed so as to provide a plurality of spaced feet which rest on the bottom wall 6 of the evaporator and support the food supporting portion 27 of the shelf in spaced relationship with respect to the bottom wall 6. Since the feet formed by the dimples 28 provide a relatively small total area of contact with the bottom wall 6, heat transferred from the bottom wall and from the heating element 15 during the defrosting operation is minimized and hence, rise in temperature of the food stored on the food supporting surface 27 of the shelf is also minimized.

Alternatively, the lower shelf can be made in the form shown in Fig. 4. In this form the shelf comprises a wire or screen rack having a food supporting surface 29 held in spaced relationship with respect to the bottom wall of the evaporator by a plurality of depending feet, one of which is shown at 30, adapted to rest on the bottom wall of the evaporator. As a further alternative, the lower shelf can be formed as a flat sheet similar to the upper shelf 12 and supported from the side walls by insulating spacers in the same manner as the shelf 12. This construction, of course, also minimizes heat transfer from the walls of the evaporator and from the heating element 15 to the food stored on the bottom shelf.

While I have shown and described specific embodiments of my invention, I do not desire my invention to be limited to the particular constructions shown and described, and I intend, by the appended claims, to cover all modifications within the spirit and scope of my invention.

What I claim as new and desire to secure by Letters Patent of the United States is:

1. In a refrigerator including a food storage compartment, an evaporator for cooling said compartment, said evaporator having a bottom wall and at least one side wall, means for cooling said walls, said walls being exposed to the air in said compartment whereby frost forms thereon, an electric heating element secured to the exposed surface of said walls for melting frost therefrom, and a wire rack resting on said bottom wall of said evaporator for supporting food stored in said evaporator, said rack including a plurality of feet depending therefrom resting on said bottom wall of said evaporator for maintaining the food stored thereon in spaced relationship with said bottom wall whereby heat transfer from said heating element to the food is minimized.

2. In a refrigerator including a food storage compartment, an evaporator for cooling said compartment, said evaporator being formed in substantially U shape and having a bottom wall and two side walls, means for cooling said walls, said walls being exposed to the air in said compartment whereby frost forms thereon, an electric heating element secured to the exposed surface of said walls for melting frost therefrom, a shelf including a food supporting surface disposed in spaced relationship with said bottom wall of said evaporator for minimizing heat transfer from said heating element to the food stored on said shelf, and heat-insulating spacers mounted on said side walls of said evaporator for supporting said shelf in spaced relationship to both said side walls and said bottom wall.

3. In a refrigerator including a food storage compartment, an evaporator for cooling said compartment, said evaporator being formed in substantially U shape and having a bottom wall and two side walls, means for cooling said walls, said walls being exposed to the air in said compartment whereby frost forms thereon, an electric heating element secured to the exposed area of said walls for melting frost therefrom, a food supporting shelf in said evaporator having a food supporting surface spaced from said bottom wall for minimizing heat transfer from said heating element to the food stored on said shelf, a second shelf mounted within said evaporator above said first shelf, means for refrigerating said second shelf, and a plurality of heat-insulating spacers mounted on said side walls of said evaporator for supporting said second shelf in spaced relationship with said side walls and minimizing heat transfer from said heating element to said second shelf.

4. In a refrigerator including a food storage compartment, an evaporator for cooling said compartment, said evaporator having a bottom wall and at least one side wall, means for cooling said walls, said walls being exposed to the air in said compartment whereby frost forms thereon, an electric heating element secured to the exposed surface of said walls for rapidly heating said walls and melting frost therefrom, and a food supporting shelf in said evaporator having a generally flat food supporting surface spaced from said bottom wall and a plurality of depending feet adapted to engage said bottom wall for holding said food supporting surface in spaced relation thereto, said feet being widely spaced for providing a very small total area of contact with said bottom wall relative to the area of said flat supporting surface whereby a poor heat transfer path between said bottom wall and said food supporting surface is provided for minimizing heat transfer from said heating element to the food stored on said shelf.

LEONARD W. ATCHISON.

References Cited in the file of this patent

UNITED STATES PATENTS

| Number | Name | Date |
| --- | --- | --- |
| 2,178,336 | Chapman | Oct. 31, 1939 |
| 2,398,035 | Pacifico | Apr. 19, 1946 |
| 2,410,194 | Baker | Oct. 29, 1946 |
| 2,429,521 | Marquis | Oct. 21, 1947 |
| 2,471,718 | Breck | May 31, 1949 |